J. C. SCHAFFER.
PACKAGING MECHANISM.
APPLICATION FILED APR. 26, 1915.
1,385,498.
Patented July 26, 1921.
2 SHEETS—SHEET 1.
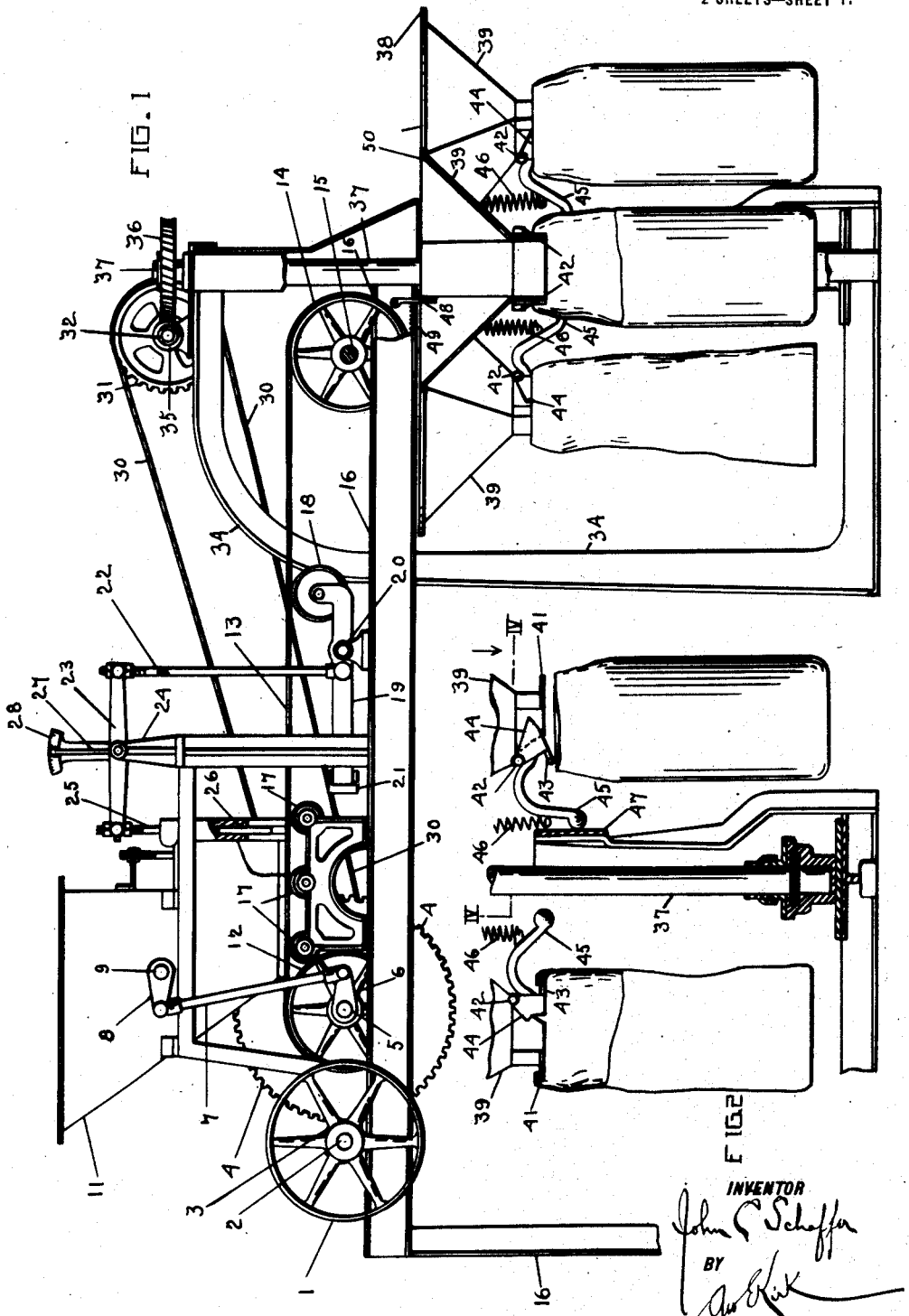

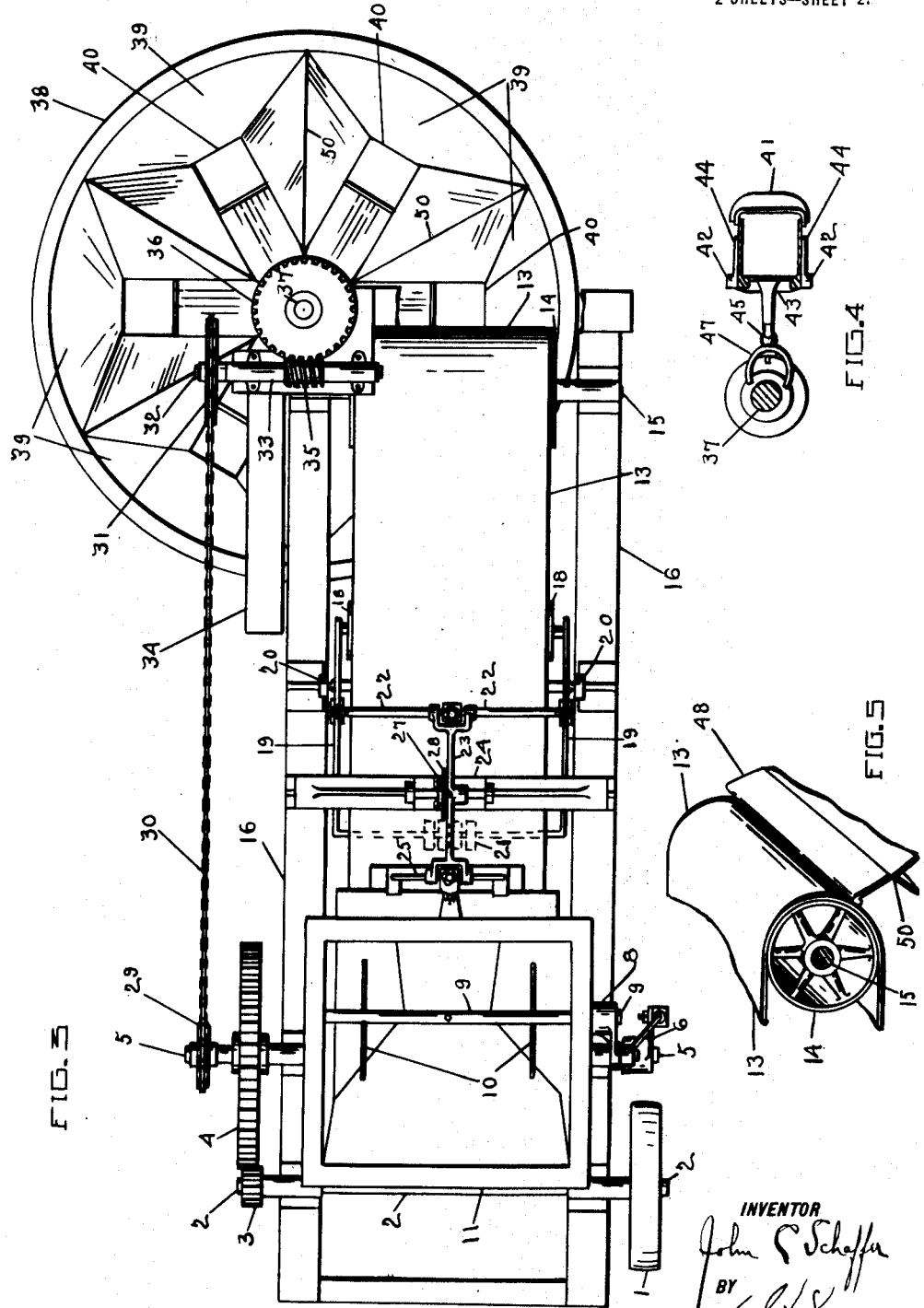

UNITED STATES PATENT OFFICE.

JOHN C. SCHAFFER, OF TIFFIN, OHIO.

PACKAGING MECHANISM.

1,385,498. Specification of Letters Patent. Patented July 26, 1921.

Application filed April 26, 1915. Serial No. 24,172.

*To all whom it may concern:*

Be it known that I, JOHN C. SCHAFFER, a citizen of the United States of America, and resident of Tiffin, Seneca county, Ohio, have invented new and useful Packaging Mechanisms, of which the following is a specification.

This invention relates to mechanism for delivering uniform quantities of material.

This invention has utility when incorporated in packaging mechanisms.

Referring to the drawings:

Figure 1 is a side elevation, with parts broken away, of an embodiment of the invention in a bag filling machine;

Fig. 2 is a fragmentary view of bag engaging and disengaging features of the invention;

Fig. 3 is a plan view of the device of Fig. 1;

Fig. 4 is a section on the line IV—IV, Fig. 2; and

Fig. 5 is a detail of the cut off for the separator hoppers or receivers.

The mechanism may be actuated from the driving pulley 1 (Figs. 1, 3) on the shaft 2 having the pinion 3 in mesh with the gear wheel 4 on the shaft 5. This shaft 5 has on the end thereof adjacent the pulley 1, a crank 6 connected by the upwardly extending link 7 to the crank 8, thereby effective to rock the shaft 9 having the arms or agitators 10 in the supply hopper 11, to preclude clogging of material therein and thereby insure a freely movable mass for discharge by said hopper.

On the shaft 5 is the driving pulley 12 for the way or conveyer belt 13 extending over the idler pulley 14 mounted on the shaft 15 carried by the mechanism frame 16 on which the shafts 2 and 5 are mounted. This belt 13 passes under the hopper 11 and over the sustaining idler pulleys 17, 18. The belt or conveyer 13 adjacent the idlers 17 forms the bottom for the hopper 11.

The conveyer sustaining idler 18 is mounted on the lever 19 having the fulcrum 20 mounted on the frame 16. To adjust the sustaining action of the idler 18, or the counterbalancing loading of the way or conveyer 13, weights 21 are mounted on the lever 19 remote from the idler 18. For self regulation of the material flow along this way 13, the lever 19 has the link 22 extending to the walking beam 23 having the fulcrum bracket 24 carried by the frame 16.

This walking beam or lever 23 is connected by the link 25 to the slide or hopper gate 26 on the side of the hopper 11 adjacent its bottom from which the way 13 travels, thereby determining the thickness or quantity of granular, lump, powdered, or other material supplied for uniform distribution along the conveyer 13. The indicator 27 movable by the lever 23 across the graduations 28 discloses the position which the idler 18 should take for proper loading of the belt 13, as well as in operation, the fluctuations in material supply, which are at once and automatically taken care of by the device with a great degree of accuracy, the refinement of which may be suited to meet the most exacting conditions.

With the self-regulated uniform material flow, by this scale or continuous automatic weighing device, determined separations of a material stream may be effected, say for packaging purposes.

Fast on the shaft 5 (Fig. 3) is the sprocket wheel 29 which through the sprocket chain 30 drives the sprocket wheel 31 on the shaft 32 mounted in bearings 33 carried by the frame 34 in fixed position as to the flow supplying mechanism frame 16. The shaft 32, through the worm 35 thereon in mesh with the worm wheel 36 on the shaft 37 rotates the member or disk 38 embodying an annular series of material receiving hoppers, pockets or separators. The relative travel of the plurality of receivers 39 as to the flow rate of the way 13 is determined so that any rate of travel of the receiver carrying shaft 37 will definitely accumulate discharge weights from the way for continued equal separations of flow quantities though there be fluctuation in the driving speed for the synchronism is maintained by the sprocket chain 30.

These separators or hoppers 39 terminate in bottom openings 40 having outwardly projecting fixed lips 41 (Fig. 4). Opposing these fixed opening sides, are the movable sides comprising the fulcra 42 providing therebelow oppositely extending movable lips 43 as to the lips 41. Cheeks 44 embrace the opening 40, are fast with the lips 43, and complete a package or bag engaging device with which a reduced diameter portion of a package or bag may engage to be sustained. This device may be controlled automatically by the arm 45 (Figs. 1, 4) held by the spring 46 normally to distend the device into engaging position. In the annular travel of these receivers 39, the arms 45 may ride against a cam 47 adjacent the shaft 37, and be rocked against the action of the springs 46 to move the lips 43 toward the lips 41, thereby allowing a filled package to be dropped or freed from the hopper carrier, while an attendant may slip another package or bag to be filled over the lips, against the resistance of the spring 46, or as the arm 45 is leaving the cam, so that by the repetition hereof continuous flow of material may be separated into uniform determined quantities, by the successive or intermittent supply to the hoppers 39.

With some characters of material, as loose lumpy stock, it may be desirable for greater accuracy, to dispose adjacent the pulley 14, a cut off or chute 48 (Figs. 1, 5) retracted by its weight or a spring 49, to ride over the ridges 50 between the hoppers. The snapping of this chute 48 past a ridge 50 as the chute is retracted by the spring 49 gives abrupt separation in material delivery from the preceding to a succeeding hopper.

In operation, with the bin or supply hopper 11 maintained charged, adjustment by weights 21 may be made for the desired weight separations of the material, and actuation of the belt 13 for carrying flow from the bin 11 will result in the hoppers 39 receiving determined supplies subdivided from this continuous uniform flow for rapid accurate quantity packaging of widely varying materials, as clay, hair plaster, lime, etc., in containers to be supplied and automatically discharged.

What is claimed and it is desired to secure by Letters Patent is:

1. A supply way for material, means for maintaining material flow of the way continuous, and uniform for equal lineal portions giving equal weights, including a conveyer belt, receivers beyond the conveyer belt to which the way delivers, and driving means between the belt and receivers including relatively movable members successively shifting the receivers for separating a definitely weighed flow portion from the way for each receiver.

2. Mechanism for separating determined weight quantities of material including a flow supply way provided with a continuous weighing device, and receiving means movable transversely of the supply way and coacting for delivery thereto of uniform quantities of the flow supply.

3. A flow supply way for material, an automatic continuous weighing device therefor, receivers to which the way delivers, and driving means for the receivers maintaining a definite lineal travel rate therefor as to the supply way whereby the receivers separate equal weighed quantities from the way.

4. A supply way for material, continuous flow maintaining means for the way, a self-regulating weighing device for the way, a separator for dividing the supply from the way, and driving means for the separator effecting equal separations of material from the way by maintaining a determined lineal travel rate as to the flow of the way.

5. An endless conveyer for supplying material, material supply regulating device movable relatively to the conveyer by the loading of material on the conveyer, a receiver to which the conveyer may deliver, and driving means timing the receiver for intermittent supply of definite lineal portions of material from the conveyer by moving the receiver relatively to the conveyer.

6. Packaging mechanism including means providing a continuous flow of material, an automatic device for maintaining said flow uniform, a plurality of hoppers for receiving material from the means, a continuous driving device for the flow means and for the hoppers, holding means carried by the hoppers for maintaining packages to be filled in position on the the hoppers, and package releasing means for the holders operable by the driven hoppers after the package has passed filling position.

In witness whereof I affix my signature.

JOHN C. SCHAFFER.